Dec. 28, 1948.    C. E. RANDALL    2,457,724
ELECTRIC RELAY FOR USE WITH ALTERNATING CURRENT
OF VARIABLE FREQUENCY AND VOLTAGE
Filed Oct. 9, 1942

Inventor
Cyril Ernest Randall
By Frank H. Hubbard
Attorney

Patented Dec. 28, 1948

2,457,724

UNITED STATES PATENT OFFICE 2,457,724

ELECTRIC RELAY FOR USE WITH ALTERNATING CURRENT OF VARIABLE FREQUENCY AND VOLTAGE

Cyril Ernest Randall, Bedford, England, assignor to Cutler-Hammer, Inc., Milwaukee, Wis., a corporation of Delaware Application October 9, 1942, Serial No. 461,360
In Great Britain March 25, 1942

3 Claims. (Cl. 172—289)

1

This invention relates to electric relays for use with alternating current of variable frequency and voltage.

The object of the invention is the provision of an improved relay of this character which will be particularly, but not exclusively, useful in connection with alternating current electric motors, for effecting the interruption of the primary circuit of the motor when it reaches substantially zero speed subsequently to "plugging."

The invention consists broadly of a relay circuit for use with an alternating current source whose frequency and voltage are both variable, wherein the winding of said relay is supplied from said source through the medium of a capacity so that said relay is responsive jointly to both the frequency and the voltage of said source.

In order that the invention may be the more clearly understood, an electric motor "plugging" control system embodying the invention will now be described, reference being made to the accompanying drawings, wherein Figure 1 illustrates the control circuits of the forward and reverse contactors of the motor;

Figure 1:
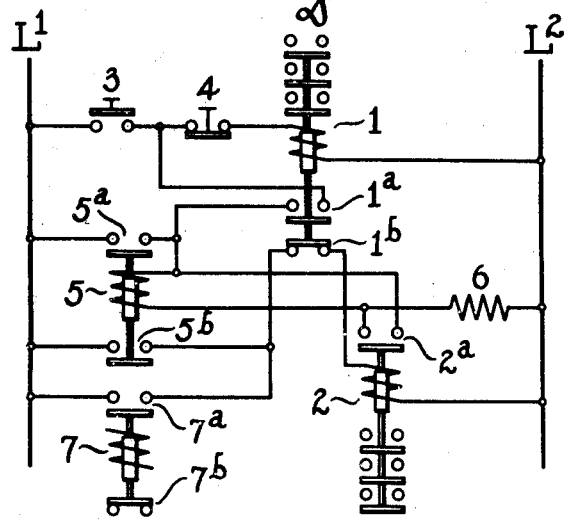

Referring first to Fig. 1 this illustrates the control circuits of the windings 1 and 2 of the forward and reverse contactors of an alternating current slip ring motor (not shown). To start the motor, a normally open start push button 3 is depressed, thereby establishing a circuit for the winding 1 of the forward contactor, said circuit extending from line L1, through said start push button 3, through a normally closed stop push button and said winding 1 to the line L2. The forward contactor accordingly closes and the motor starts in the forward direction. Simultaneously an auxiliary contact 1a on said forward contactor closes and thereby establishes an energizing circuit for the winding 5 of a relay, said circuit extending from line L1, through start push button 3, said auxiliary contact 1a, said winding 5 and a ballast resistance 6 to the line L2. Said relay, upon energization of its winding 5, accordingly closes contacts 5a and 5b. Closure of contacts 5a short circuits the start push button 3 and enables the latter to be released wtihout deenergization of either of windings 1 or 5. Closure

2 of contacts 5b is for the moment without effect, as normally closed auxiliary contacts 1b on the forward contactor, which are in series with said contacts 5b, have already opened upon closure of said forward contactor.

The motor is now running in the forward direction. If it is desired to stop the motor by plugging, the stop push button switch 4 is depressed and opened whereby the circuit of the winding 1 of the forward contactor is deenergized and said forward contactor opens deenergizing the motor for forward running. Simultaneously the auxiliary contacts 1a are opened and the auxiliary contacts 1b are closed. Opening of contacts 1a prevents reenergization of winding 1 when stop push button 4 is released. Closure of contacts 1b effects the energization of the winding 2 of the reverse contactor by way of a circuit from line L1, through contacts 5b, through said contacts 1b and said winding 2 to the line L2. The reverse contactor accordingly closes, thereby energizing the forwardly running motor for reverse running, or, in other words, "plugging" the motor, which accordingly commences very rapidly to come to rest.

The reverse contactor, upon closure, closes auxiliary contacts 2a which accordingly short circuit the relay winding 5, whereupon contacts 5a and 5b both open. Opening of contacts 5a prevents current wastage through ballast resistance 6 and also prevents reenergization of winding 5 when reverse contactor drops out. Upon opening of contacts 5b, winding 2 is not de-energized, because, immediately plugging takes place, the winding 7 (Fig. 2) of a frequency and voltage responsive relay is energized, as will be described hereinafter, and the normally open contacts 7a of said relay (Fig. 1), which are in parallel with said contacts 5b, close. The position therefore now is that the duty of energizing the winding 2 of the reverse contactor is put entirely on the contacts 7a of the aforesaid frequency and voltage responsive relay.

When the motor reaches substantially zero speed, the winding 7 of the frequency and voltage responsive delay is de-energized sufficiently, as will be described hereinafter, for said relay to drop out thereby opening said contacts 7a. The winding 2 of the reverse contactor is thus deenergized so that said reverse contactor opens and the motor is deenergized when substantially at rest.

Figure 2:
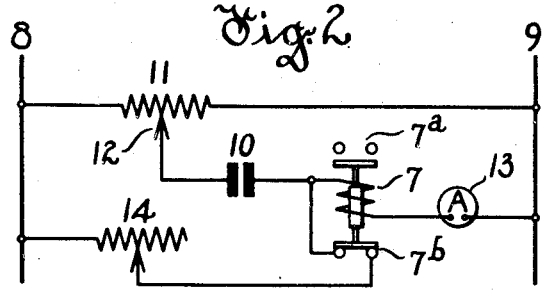
Fig. 2 illustrates the control circuits of a frequency and voltage responsive relay employed for timing the opening of the reverse contactor when plugging.

Describing now with particular reference to Fig. 2 the operation of the frequency and voltage responsive relay, the winding 7 of this relay is connected to the terminals 8, 9 of one phase of the motor secondary by way of two distinct circuits, one of which circuits takes command when the aforesaid contacts 7a are closed and is responsive to both the voltage and frequency of the motor secondary to open said contacts 7a when the motor is at rest, and the other of which circutis takes command when the contacts 7a are open and is responsive to the voltage only of said motor secondary to close said contacts 7a when the motor is plugged.

The former of these circuits which may be termed the contact-opening circuit, includes, in series with said winding 7, a condenser 10 of selected capacity, and is connected to the terminals 8, 9 through a potentiometer resistance 11, said resistance 11 being connected across said terminals 8, 9, and the contact-opening circuit being completed from the variable tapped point 12 of said resistance 11, through said condenser 10 and said winding 7 to the terminal 9. The reference 13 designates a small ammeter for measuring the current in the winding 7.

The other circuit, which may be termed the contact-closing circuit, includes an adjustable series resistance 14, and extends from the terminal 8, through said resistance 14, a normally closed auxiliary contact 7b on the frequency and voltage responsive relay and the winding 7 to the terminal 9.

Assuming the contacts 7a to be closed and the motor in the condition of being "plugged" subsequently to the depression of the stop push button switch 4, the contact-closing circuit will be completely inoperative owing to the opening of the auxiliary contacts 7b. The winding 7 will be energized by a current which will depend upon the voltage across the terminals 8, 9 of the motor secondary, and also, by virtue of the series resonator acceptor circuit afforded by the condenser 10 and winding 7, upon the frequency of said motor secondary. As the motor slows down, this voltage and frequency will both fall and the fall in voltage and the fall in frequency will both cause a reduction of current in the winding 7. By correct preadjustment of the tapped point 12, it can be arranged that, when the motor speed falls to substantially zero as before stated, the current in the winding 7 will have fallen to such an extent that the relay drops out opening its main contacts 7a and deenergizing the motor.

The relay is of the kind having the usual contactor type magnetic circuit, and thus the dropping away of the armature when the relay opens causes a large change in the inductance of the winding 7. Thus a resonance value of the resonator acceptor contact-opening circuit selected for the closed condition of the magnetic circuit of the relay will be changed by some hundreds per cent when said magnetic circuit is opened with the opening of the contacts 7a.

Chiefly for this reason, the contact-opening circuit cannot be employed to reclose the relay in response to the increase of the voltage and frequency of the motor secondary when the motor is plugged. The same circuit would never succeed in closing the relay. For re-closing the relay therefore when the motor is plugged, the aforesaid contact-closing circuit is employed. When the relay opens its main contacts 7a, the contacts 7b close thereby completing said contact-closing circuit as before described, and, when the voltage of the motor secondary rises to a given value upon the motor being plugged, the current supplied to said winding 7 by way of this contact-closing circuit through 14 and 7b is sufficient to re-close the main contacts 7a of the relay. The contact-opening circuit through the condenser 10 is substantially without effect at this stage. The contacts 7b open late when the relay is already nearly closed and its inertia is sufficient to complete its closure. Then the magnetic circuit being again closed, the contact-closing circuit is out of action and the contact-opening circuit again functions to retain the relay closed until the motor reaches zero speed as hereinbefore described.

Obviously the voltage of the motor secondary depends on that of the supply to the motor primary and thus, if, for example, the voltage of the supply were to increase, this would correspondingly increase the voltage of the motor secondary, with the result that the frequency and voltage responsive relay would tend to open its contacts 7a too late and the reverse contactor would remain closed until after the motor had reversed. On the other hand, if the voltage of the supply were to decrease the contacts 7a would open too early and the reverse contactor would open while the motor was still running forwards. This undesirable effect is much less when the described frequency and voltage responsive relay is employed than when a purely voltage responsive relay is employed. Nevertheless it may be desirable to compensate for this effect so as to ensure that, within limits, despite such variations the contacts 7a will always open at the correct moment.

Figure 3:
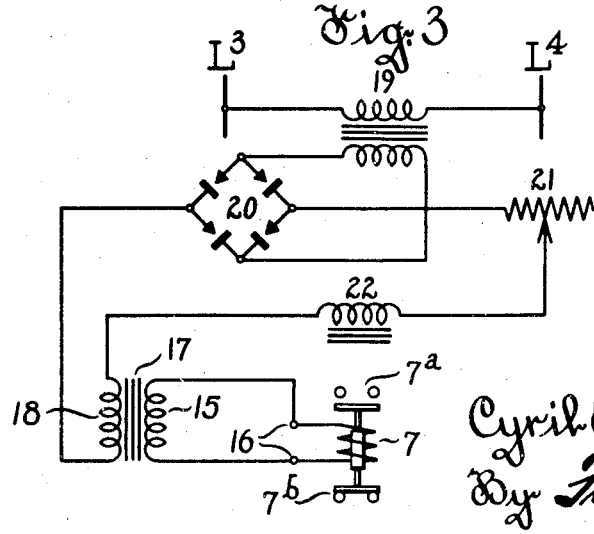
Fig. 3 illustrates a compensating arrangement which may be applied to the said frequency and voltage responsive relay to compensate for variations in the line voltage.

A compensating arrangement for this purpose is illustrated in Figure 3. This comprises a winding 15 connected directly in shunt with the winding 7, as indicated at 16 in Fig. 3, said winding 15 being adapted to have its inductance varied as a function of the supply voltage in such a way that according to whether said supply voltage rises or falls, thereby tending to increase or decrease the energization of the winding 7, the inductance of the winding 15 is lowered or raised so that said winding by-passes a greater or less proportion of the current flowing to the winding 7. In this way the arrangement is such that, within probable working limits, the energization of the winding 7 will be unaffected by variations of the voltage of the supply.

To cause the inductance of the winding 15 to vary as stated, said winding, which is kept of fairly low resistance, is wound on an iron circuit 17 of modest dimensions on which also is wound a winding 18 supplied with direct current which is derived from and is proportional to the supply voltage. Thus according to whether the supply voltage rises or falls, the flux density in the iron circuit 17 is increased or decreased and the inductance of the winding 15 is lowered or raised.

As clearly shown, the current in the winding 18 is derived from the supply mains L3, L4 through a transformer 19 and a small metal rectifier 20, a variable resistance 21 and choke 22 being connected, in series with the winding 18, in the rectifier output.

Obviously in cases where no variation of the supply voltage is to be expected, the compensating circuit illustrated in Fig. 3 will not be required. In a particular case the compensating circuit was found capable of dealing with voltage variations between fifteen per cent below and ten per cent above normal.

The frequency and voltage responsive relay as described has been found to be sensitive to small changes of applied energy so that it opens and closes within small limits at the points required. These points are of course readily predetermined by adjustment respectively of the potentiometer resistance 11 and the series resistance 14. The relay has also been found stable and free from chattering right down to its disengagement point, and reliable in operation at any necessary setting point.

As a modification of the system hereinbefore described, the auxiliary contacts 7b, instead of bringing into operation the distinct so-called contact-closing circuit, could equally well be employed to add to the capacity of the condenser 10 in such a way as to compensate for the change in inductance of the winding 7 caused by the opening of the magnetic circuit of the relay. Thus the circut hitherto termed the contact-opening circuit, would, duly compensated by the increase in the capacity of the condenser 10, serve also for closing the contacts 7a of the relay.

The relay would then respond jointly to frequency and voltage both in opening and in closing.

What I claim and desire to secure by Letters Patent is:

1. In combination, an alternating current circuit variable in respect of voltage and frequency, a resistor connected across said circuit, a relay having a winding connected between a tap of said resistor and one side of said circuit, a condenser included in circuit between said resistor and said winding, and means for establishing an alternative energizing circuit of given resistance value for said winding shunting said condenser.

2. In combination, an alternating current circuit variable in respect of voltage and frequency, a resistor connected across said circuit, a relay having a winding connected between a tap of said resistor and one side of said circuit, a condenser included in circut between said resistor and said winding, and means for establishing an alternative energizing circuit of given resistance value for said winding shunting said condenser, said means comprising normally engaged contacts associated with said relay and disengaged thereby upon movement thereof to a given position.

3. In an alternating current motor controller, in combination, electromagnetic reversing and plugging switches, a relay having a winding to be supplied from one phase of the secondary circuit of a motor, means rendering said relay responsive to the voltage of said secondary circuit upon initiation of plugging action, for predetermined positioning of said relay and then commutating the circuit connections of said relay winding, and a condenser rendering said relay winding, after its connections are so commutated, sensitive to joint influence of the voltage and frequency of said secondary circuit.

CYRIL E. RANDALL.

REFERENCES CITED

The following references are of record in the file of this patent:

UNITED STATES PATENTS

| Number | Name | Date |
|---|---|---|
| 2,021,753 | Suits | Nov. 19, 1935 |
| 2,165,491 | Leitch | July 11, 1939 |